UNITED STATES PATENT OFFICE.

PERCY ALBERT BOECK, OF NEW YORK, N. Y., ASSIGNOR TO CELITE PRODUCTS COMPANY, OF LOS ANGELES, CALIFORNIA, A CORPORATION OF CALIFORNIA.

DECOLORIZER.

1,272,197.   Specification of Letters Patent.   Patented July 9, 1918.

No Drawing.   Application filed June 14, 1917.   Serial No. 174,725.

*To all whom it may concern:*

Be it known that I, PERCY A. BOECK, a citizen of the United States, and a resident of the city of New York, borough of Manhattan, in the county and State of New York, have invented a new and Improved Decolorizer, of which the following is a full, clear, and exact description.

My invention relates to a substance or mixture of substances of which calcined infusorial earth is a constituent.

An object of the invention is to form a decolorizer from infusorial earth by calcining it.

A further object of the invention is to form a decolorizer of infusorial earth and fullers' earth, whereby the efficiency of the fullers' earth is increased due to the presence of the infusorial earth, as the infusorial earth, in addition to helping to decolorize, increases or presents a larger surface of the fullers' earth to the substance to be decolorized.

Another object of the invention is to produce a decolorizer in which a finer grade of fullers' earth can be used without danger of clogging during the filtration.

I am well aware that kieselguhr or infusorial earth has been utilized for decolorizing purposes, and there are contradictory opinions as to the decolorizing properties of kieselguhr, as, for example, *Chemiker* of 1891, S. 1603, states that pure kieselguhr will only filter and will not bleach. On the other hand, Hefter's *Technologie der Fette und Öle Band* I, 1906, page 660, contradicts that by stating that natural kieselguhr bleaches and decolorizes oils and fats, and that this is a well established fact. This, again is contradicted by Kern, see *Chemishe Revue*, 1904, page 51. From my personal experience in the matter I find that the decolorizing properties of kieselguhr depends considerably on the character of the subject matter to be decolorized, its physical properties, temperature, agitation, and possibly of oxidation. I have found cases where kieselguhr does appreciably lighten the color of the oil and decolorize it, but whether this is due to a mechanical, physical or chemical reaction with the kieselguhr, it is impossible to say definitely.

It is a recognized fact that considerable of the bleaching or decolorizing action in oils is determined by the physical nature of the material through which it is filtered. For instance, the matter of absorption and of variation in porosity has been shown by Parsons in his bulletin on the action of fullers' earth on oils to have great influence on the nature of the product. In other words, even with fullers' earth the physical condition of the filtering medium is recognized, independently of its decolorizing action.

I have found that calcined kieselguhr is a more efficient decolorizer than ordinary kieselguhr. Furthermore it resists better the tendency of the mass to agglomerate and, in consequence, choke the filters. Further, it increases the resistance of the particles of the kieselguhr and, therefore, presents a larger area for filtration; or, when mixed with fullers' earth it exposes the fullers' earth so as to present a larger surface of the fullers' earth to the action of the matter to be decolorized.

Although calcined infusorial earth gives very satisfactory results for many oils, in the decolorizing of fatty acids the best results have been obtained with mixtures containing equal quantities by weight of calcined infusorial earth and fullers' earth. For example, to decolorize stearic acid, for 1400 gallons of same, a mixture containing 21 pounds of fullers' earth and 21 pounds of kieselguhr is mixed dry. It is then incorporated in the body of the stearic acid by a thorough mixing and heating the mass to a temperature of about 140° F., and then the entire mass is forced through a filter press at about sixty pounds pressure. The resulting acid is not only bleached, but it comes out as a very marketable article.

It has been possible to use in the mixture fullers' earth of a finer grade, which is ordinarily discarded due to its tendency to clog the filters if used alone, but in the mixture with the infusorial earth it can be used without danger of clogging.

Although the best results are obtained with a mixture containing equal quantities by weight of infusorial earth and fullers' earth, in certain cases the quantity of the fullers' earth by weight may be decreased to be negligible or increased to exceed that of the kieselguhr. It may be remarked that the relative proportions of the infusorial and fullers' earths may depend on the viscosity of the liquid to be treated and, therefore, I do not want to be limited to the specific ratio disclosed.

I claim:

1. A decolorizer including fullers' and infusorial earths.

2. A decolorizer formed of infusorial and fullers' earths in equal proportions by weight.

3. A decolorizer including fullers' earth and calcined infusorial earth.

4. A decolorizer consisting of fullers' earth and a calcined substance adapted to present a larger surface of the fullers' earth and reduce the chance of clogging by the fullers' earth.

5. A decolorizing mixture containing calcined infusorial earth.

6. A decolorizer formed of fullers' earth and a granular substance for diluting the fullers' earth so as to present a larger area of the fullers' earth to the matter to be decolorized.

7. A decolorizer consisting of calcined kieselguhr and a decolorizing substance of a higher grade than the kieselguhr, for which the calcined kieselguhr forms a diluent.

PERCY ALBERT BOECK.